United States Patent [19]

Roder

[11] Patent Number: 4,667,373

[45] Date of Patent: May 26, 1987

[54] CONDITIONING BALED MATERIAL

[75] Inventor: Edward A. Roder, Narre Warren, Australia

[73] Assignee: Australian Wool Corporation, Victoria, Australia

[21] Appl. No.: 816,054

[22] Filed: Jan. 3, 1986

[30] Foreign Application Priority Data

Jan. 10, 1985 [AU] Australia ............................ PG8833

[51] Int. Cl.⁴ ....................... D01G 37/00; D06C 1/04
[52] U.S. Cl. ...................................... 19/66 R; 68/5 C
[58] Field of Search .................... 19/0.27, 66 R, 66 C, 19/80 R; 28/267; 68/5 C

[56] References Cited

U.S. PATENT DOCUMENTS

| 233,288 | 10/1880 | Seeland | 19/66 R |
| 2,139,543 | 12/1938 | Finlayson et al. | 19/66 R |
| 3,879,965 | 4/1975 | Champel et al. | 68/5 C |

FOREIGN PATENT DOCUMENTS

| 45-41062 | 12/1970 | Japan | 28/267 |
| 0166588 | 1/1965 | U.S.S.R. | 19/66 R |

Primary Examiner—Louis K. Rimrodt
Attorney, Agent, or Firm—Cushman, Darby & Cushman

[57] ABSTRACT

Apparatus and method for conditioning baled materials by forcing moisture laden heated air or stream under pressure into the bale over part of the surface area of at least two sides of the bale.

5 Claims, 3 Drawing Figures

CONDITIONING BALED MATERIAL

This invention relates to a method and apparatus for conditioning baled materials such as wool and other fibrous materials.

When wool is transported in bales to countries having cold climates, the wool is often frozen for considerable periods of the year. Similarly, when baled and dumped wool is placed in long term storage, the fibre develops a set, the extent to which depends on the factors of time, temperature, density and moisture content. It will be appreciated that baled wool which has a high set factor caused by low temperatures or long term storage is extremely difficult to open for further processing and the wool must be left for considerable periods of time until the set in the wool eventually releases.

While it is known to inject steam into frozen bales through a probe which penetrates the bale to speed the thawing process, thawing does not take place uniformly and difficulties are often experienced in obtaining adequate penetration of the probe due not only to the frozen state of the fibres but also to the high density of the fibres in the bale. Accordingly, the injection of steam in this manner is not a satisfactory solution to the problem of frozen bales and similarly does not provide a solution to the problem of opening high density long term storage bales.

It is accordingly the object of the present invention to provide a method and apparatus for conditioning baled materials in which the above problem is at least substantially ameliorated.

In a first aspect of the present invention, there is provided a method of conditioning baled materials comprising the step of forcing moisture laden heated air or steam under pressure into the bale over part of the surface area of at least two sides of the bale so that said air/steam penetrates the material in the bale in a relatively uniform manner.

In another aspect, the invention provides an apparatus for conditioning baled materials comprising at least two plenum pads, means for clamping said pads in sealing contact with at least two opposite sides of the surface of a bale to be treated, means for forcing moisture laden heated air or steam under pressure into said bale via said plenum pads whereby air/steam penetrates the material in said bale in a relatively uniform manner.

In a preferred form of the above defined aspects of the invention, moisture laden heated air is forced into the bale at a pressure of from about 100 kPa to about 200 kPa, at a temperature of from about 80° C. to about 120° and at a relative humidity of at least the order of 90%.

At the present stage of development, a plenum pad clamping force of the order of 35 to 50 tonnes is sufficient to cause adequate sealing of the plenum pads in contact with the surface of the bale whereby substantially uniform penetration of the air/steam into the material in the bale is achieved.

In a particularly preferred form of the invention, plenum pads are clamped to the top and two opposed side surfaces of a bale and moisture laden air is caused to penetrate the fibres in the bale under the conditions outlined above. Experiments have shown that under these conditions the temperature of a bale having a fibre density of the order of 700 kg/m$^3$ may be elevated from minus 20° C. to 65° C. in approximately 20 to 25 minutes. Similarly, other experiments have shown that long term storage bales which have previously been extremely difficult to open may be opened with relative ease after treatment according to the invention for a period of time of the order of that indicated above under the conditions indicated above.

One presently preferred embodiment of the invention is shown schematically in the accompanying drawings, in which.

Figure 1:
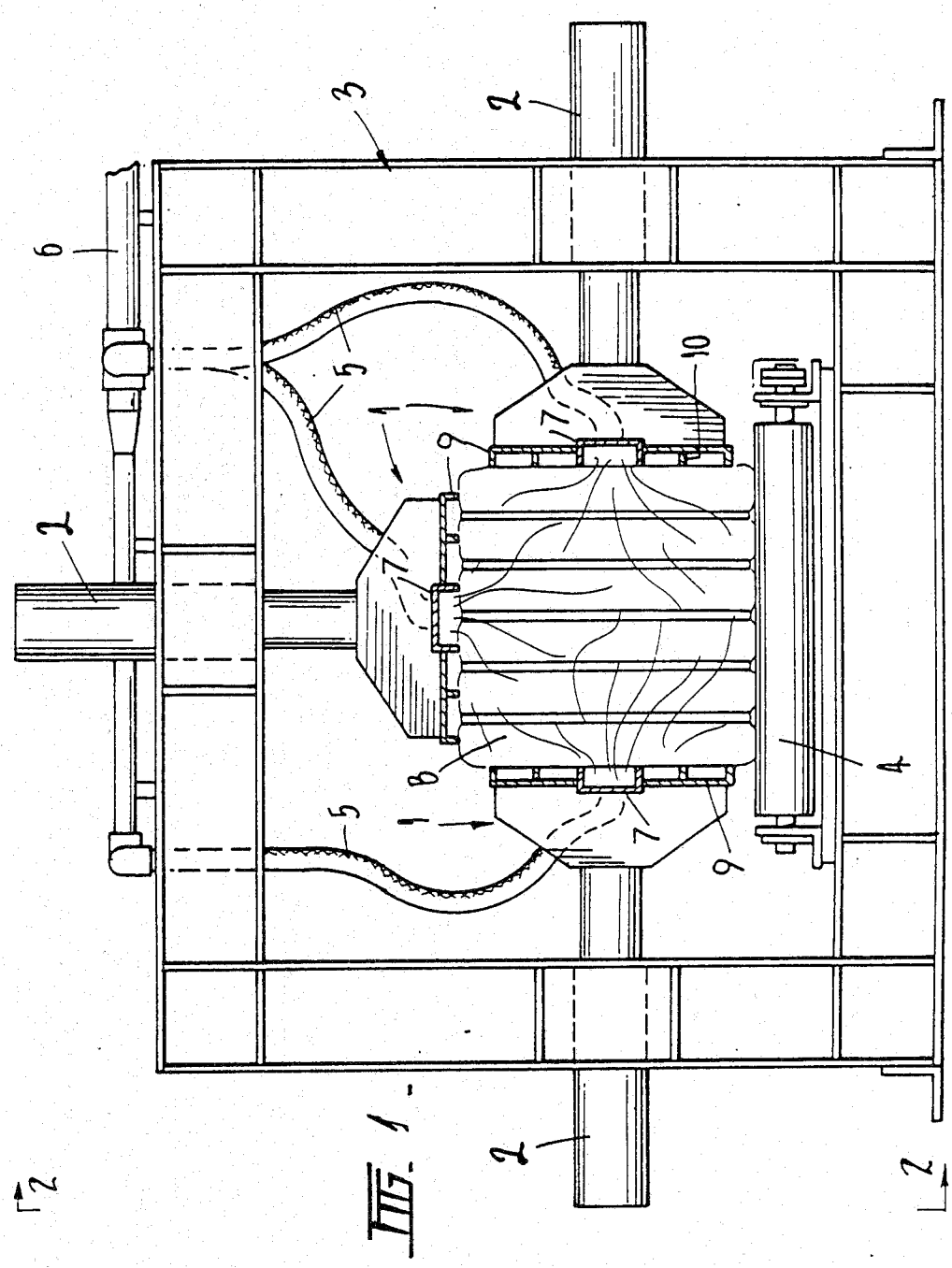
FIG. 1 is a front elevation of an apparatus embodying the invention.
Figure 2:
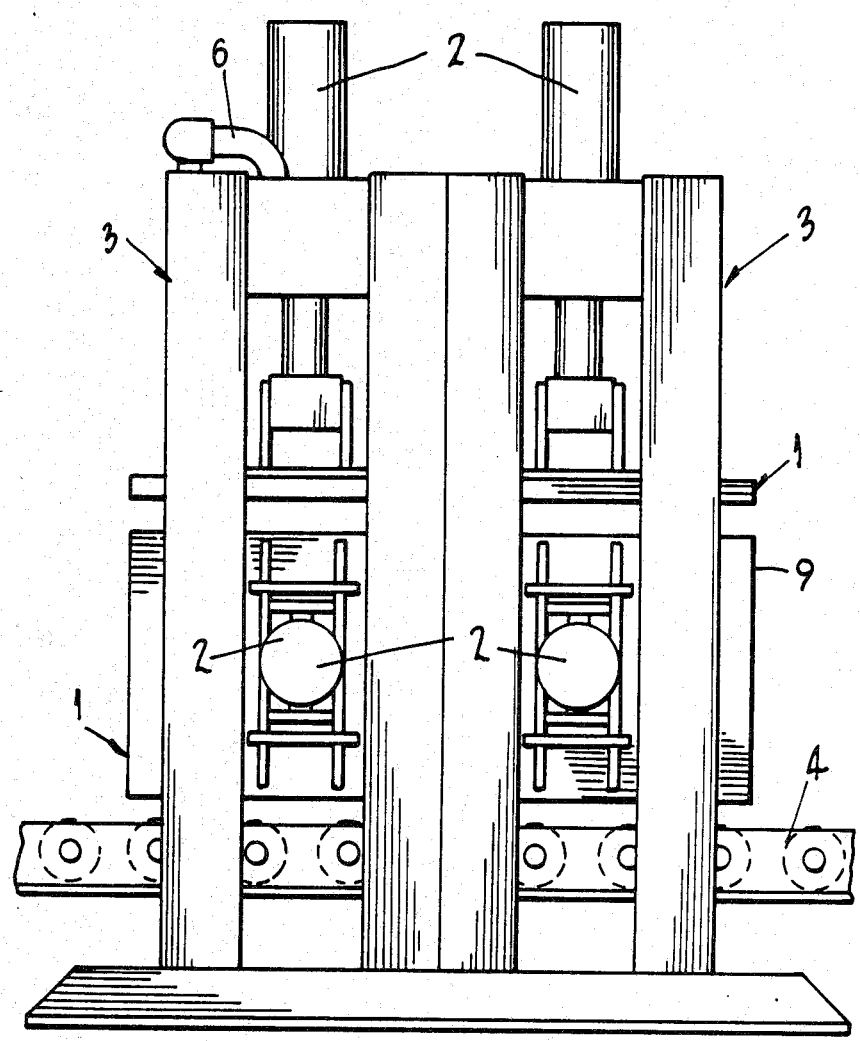
FIG. 2 is a side elevation of the apparatus of FIG. 1.
Figure 3:
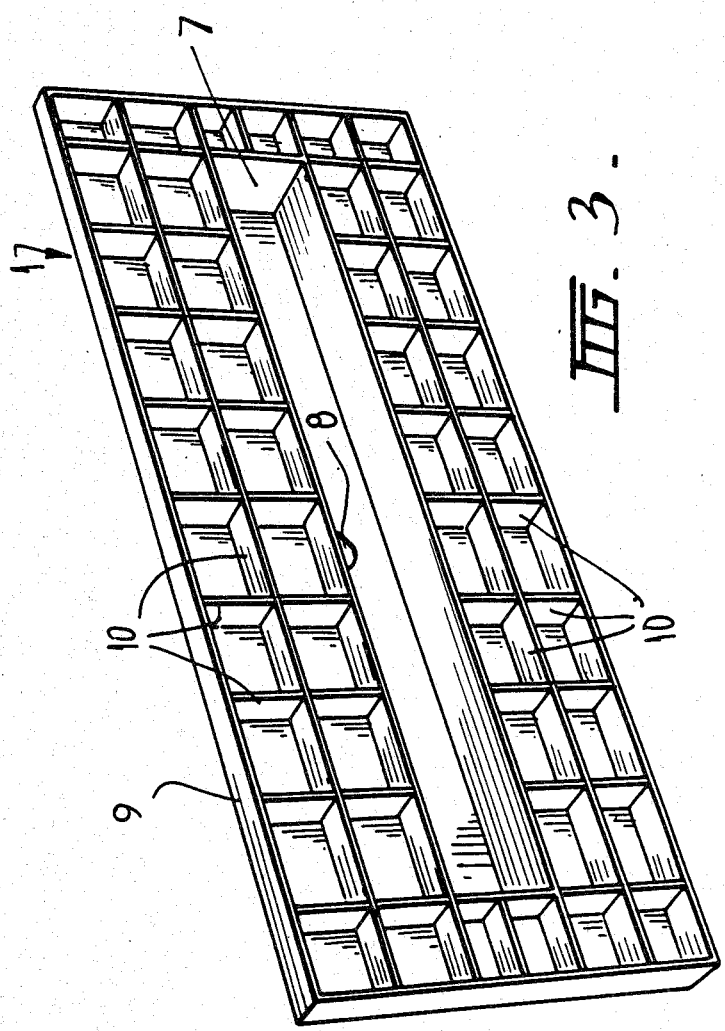
FIG. 3 shows the construction of one of the plenum pads used in the apparatus of FIGS. 1 to 3.

Referring firstly to FIGS. 1 to 3 of the drawings, it will be noted that three plenum pads 1 are supported by pairs of clamping cylinders 2 which are in turn supported by a support frame 3 which straddles a conveyor 4 upon which a dumped bale B is supported for treatment. As indicated above, a clamping force of the order of 35 to 50 tonnes is applied between the opposed plenum pads and between the upper plenum pad and the conveyor 4. An air/steam mixture, which provides a relative humidity at least of the order of 90%, is delivered to each plenum pad 1 via flexible tubing 5 attached to supply piping 6 supported by the frame 3.

Referring now to FIG. 4 of the drawings, each plenum pad will be seen to comprise a central open ended channel 7 into which moisture laden heated air is delivered through an opening 8 via tubing 5. The channel 7 is surrounded by a frame 9 within which divider plates 10 form a honeycomb sealing structure. Although other methods of sealing the plenum pad may be adopted, it has been found that the honeycomb structure shown in FIG. 3 is both simple and effective.

Air heated to a temperature of between 80° C. and 120° C., and most preferably around 110° C., is delivered to each plenum pad 1 under a pressure of between 100 kPa to 200 kPa, and most preferably around 200 kPa, with a relative humidity of at least the order of 90%. The flow rate of the air will be determined by the permeability of the bale but flow rates of the order of 2,000 liters per minute have been experienced with bales of wool dumped to a density of 700 Kg/m$^3$. The moisture laden air is delivered to each plenum pad 1 by means of a blower (not shown), such as a Rootes blower which forces the air over a suitable heat exchanger while injected steam delivers the required moisture content to increase the relative humidity to the above indicated level. The direction of penetration of the moisture laden air is shown schematically in FIG. 1 of the drawings.

Although the use of three plenum pads of the above type is preferred, acceptable results are achieved by the use of two opposed plenum pads between which the dumped bale is held under clamping forces of the order of those indicated above.

The apparatus shown in the accompanying drawings has been successfully tested with frozen dumped bales and with long term storage bales which were known from past experience to be difficult to open. In the case of frozen bales, it was found that a bale frozen to a temperature of −20° C. could be elevated to a temperature of 65° C. in approximately 20 to 25 minutes. Similarly, long term storage bales conditioned for a similar period were found to be sufficiently conditioned to be easy to open.

It has been found that the relative humidity of the moisture laden air or steam should be at least of the order of 90% otherwise the desired percentage regain in the wool of the order of 16% is not attained.

I claim:

1. A method of conditioning baled materials comprising the step of forcing moisture laden heated air or steam having a relative humidity at least about 90% under pressure into the bale over part of the surface area of at least two sides of the bale so that said air/steam penetrates the material in the bale in a relatively uniform manner, said moisture laden heated air or steam being forced into said bale at a pressure which achieves said relatively uniform penetration of the material in the bale when said material is at a density of about 700 kg/m$^3$ while keeping the temperature of said moisture laden heated air or steam within the range 80° C. to 120° C.

2. The method of claim 1, wherein said temperature is about 110° C.

3. An apparatus for conditioning baled materials comprising at least two plenum pads, means for clamping said pads in sealing contact with at least two opposite sides of the surface of a bale to be treated, means for forcing moisture laden heated air or steam having a relative humidity at least of the order of 90% under pressure into said bale via said plenum pads whereby air/steam penetrates the material in said bale in a relatively uniform manner, said moisture laden heated air or steam being forced into said bale at a pressure which achieves said relatively uniform penetration of the material in the bale when said material is at a density of the order of 700 kg/m$^3$ while keeping the temperature of said moisture laden heated air or steam within the range 80° C. to 120° C.

4. The apparatus of claim 3, wherein said temperature is controlled at about 110° C.

5. A method of conditioning a bale of compressed wool fibers comprising: applying a plenum pad to each of at least two opposite sides of the bale, each plenum pad having a peripheral edge structure and an open plenum portion surrounded by the edge structure and facing the respective side of the bale, said open plenum portion extending along a substantial portion of the respective side of the bale, forcing at least one of the plenum pads toward the other to clamp the bale between them and to force each edge structure into sealing engagement with the adjacent surface of the bale; and forcing moisture laden air or steam into the plenum chambers under pressure sufficient to cause the air or gas to pass through the surface of the bale and to penetrate the bale relatively uniformly, the air or steam having a relative humidity of at least about 90% and a temperature in the range of 80° C. to 120° C.

* * * * *

UNITED STATES PATENT AND TRADEMARK OFFICE

Certificate

Patent No. 4,667,373                                                                         Patented: May 26, 1987

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Edward A. Roder and Gregory J. Napper.

Signed and Sealed this 23rd Day of January, 1990.

WERNER H. SCHROEDER

*Supervisory Patent Examiner*
                                                                         *Patent Examining Art Unit 247*